(12) United States Patent
Althobaiti et al.

(10) Patent No.: US 12,283,003 B2
(45) Date of Patent: Apr. 22, 2025

(54) REMOTE ASSISTANCE USING AUGMENTED REALITY

(71) Applicant: Saudi Arabian Oil Company, Dhahran (SA)

(72) Inventors: Abdulrahman Althobaiti, Thuwal (SA); Fadl Abdellatif, Thuwal (SA); Sahejad Patel, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 326 days.

(21) Appl. No.: 17/714,704

(22) Filed: Apr. 6, 2022

(65) Prior Publication Data
US 2023/0326143 A1   Oct. 12, 2023

(51) Int. Cl.
| | |
|---|---|
| G06T 19/00 | (2011.01) |
| G06T 19/20 | (2011.01) |
| G06V 20/20 | (2022.01) |
| G06V 20/64 | (2022.01) |
| H04N 21/2187 | (2011.01) |
| H04N 21/4788 | (2011.01) |

(52) U.S. Cl.
CPC .......... *G06T 19/006* (2013.01); *G06T 19/003* (2013.01); *G06T 19/20* (2013.01); *G06V 20/20* (2022.01); *G06V 20/64* (2022.01); *H04N 21/2187* (2013.01); *H04N 21/4788* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 2016/0275079 A1* | 9/2016 | Kluckner | G06T 7/74 |
| 2018/0025659 A1* | 1/2018 | Liu | G09B 19/0053 |
| | | | 434/365 |
| 2018/0322702 A1 | 11/2018 | Djajadiningrat | |
| 2020/0143593 A1 | 5/2020 | Rudman et al. | |
| 2021/0192413 A1 | 6/2021 | Shirazipour et al. | |

(Continued)

OTHER PUBLICATIONS

Vijaimukund Raghavan, Jose Molineros, Rajeev Sharma, "Interactive Evaluation of Assembly Sequences Using Augmented Reality", 1999, IEEE Transactions on Robotics and Automation, 15(3):435-449 (Year: 1999).*

(Continued)

*Primary Examiner* — Michael J Cobb
(74) *Attorney, Agent, or Firm* — Fish & Richardson P.C.

(57) ABSTRACT

Disclosed are methods, systems, and computer-readable medium to perform operations including: receiving a plurality of three-dimensional (3D) models of a plurality of assembly parts of a physical object; displaying, on a display device and over a live video of the plurality of assembly parts, an augmented reality (AR) overlay including the plurality 3D models; providing the plurality 3D models to a remote device for display on the remote device; receiving, from the remote device, data indicative of instructions for assembling the plurality of assembly parts into the physical object; and modifying, based on the received data, the AR overlay displayed on the display device to provide the instructions for assembling the plurality of assembly parts into the physical object.

12 Claims, 10 Drawing Sheets

(56) References Cited

U.S. PATENT DOCUMENTS

2022/0277524 A1* 9/2022 Shtok .................. G06T 7/194
2022/0301266 A1* 9/2022 Greco .................. G06F 3/011

OTHER PUBLICATIONS

Jason Rambach, Alain Pagani, Michael Schneider, Oleksandr Artemenko, Didier Stricker, "6DoF Object Tracking based on 3D Scans for Augmented Reality Remote Live Support", 2017, Computers, 7(6):1-22 (Year: 2017).*

Sri Sudha Vijay Keshav Kolla, Andre Sanchez, Meysam Minoufekr, Peter Plapper, "Augmented Reality in Manual Assembly Processes", 2020, 9th International Conference on Mass Customization and Personalization—Community of Europe, pp. 121-126 (Year: 2020).*

Jonas Blattgerste, Benjamin Strenge, Patrick Renner, Thies Pfeiffer, and Kai Essig, "Comparing Conventional and Augmented Reality Instructions for Manual Assembly Tasks", 2017, Proceedings of the 10th PErvasive Technologies Related to Assistive Environments Conference, pp. 75-82 (Year: 2017).*

Jonas Blattgerste, Patrick Renner, Benjamin Strenge and Thies Pfeiffer, "In-Situ Instructions Exceed Side-by-Side Instructions in Augmented Reality Assisted Assembly", 2018, Proceedings of the 11th PErvasive Technologies Related to Assistive Environments Conference, pp. 133-140 (Year: 2018).*

Zhuo Wang et al., "A Comprehensive Review of Augmented Reality-Based Instruction in Manual Assembly, Training, and Repair," 2022, Robotics and Computer-Integrated Manufacturing, vol. 78, 102407 (Year: 2022).*

\* cited by examiner

REMOTE ASSISTANCE USING AUGMENTED REALITY

TECHNICAL FIELD

This disclosure relates to remote assistance using augmented reality.

BACKGROUND

New digital technologies are ushering the fourth industrial revolution in many industries to improve efficiency, safety, and operating costs. Augmented reality (AR) is one of these promising technologies that provide cutting-edge capabilities to field operators to digitally transform their day-to-day work.

SUMMARY

Augmented reality (AR) provides cutting-edge capabilities to field operators to digitally transform their daily work. One type of system where AR can be used is a system that provides a field operator with remote assistance from a remote expert. In such a system, the remote expert provides assistance, perhaps related to a physical object in proximity of the field operator, through information provided as an AR overlay on a live video feed viewed by the field operator. However, existing AR solutions have limitations. One of these limitations is related to the field of view of the remote expert. Specifically, if the remote expert needs to look at the physical object from multiple angles, they have to ask the field operator to either rotate the object manually or to move around the object (if it is immovable), thereby making the feedback process slow and less user-friendly.

This disclosure describes methods and systems for remote assistance video communication that enables a remote user (e.g., an expert) on one end of the communication to manipulate a three-dimensional (3D) model of an object that is physically present on the other end of the communication. In an embodiment, an augmented reality (AR) system acquires a scan of the object, either autonomously or via user input (e.g., a local user uses an image sensor to scan the object). The AR system generates a 3D model of the object based on the scan. The 3D model is then provided to a remote computer device associated with the remote user. The remote computer device displays the 3D model (e.g., as an AR overlay) and the remote user can interact with the displayed 3D model (e.g., move the 3D model or annotate it).

Among other examples, the disclosed methods and systems can be used to provide remote assistance for mechanical assembly tasks. This functionality can be achieved by capturing scans of the disassembled parts of the object to be assembled. Then, 3D models of the disassembled parts are provided to the remote user. The disclosed methods and systems enable the remote user to virtually assemble the disassembled parts into the desired object. The local user can view the virtual assembly and perform the actual assembly of the parts as was done by the expert.

One aspect of the subject matter described in this specification may be embodied in methods that include: receiving a plurality of three-dimensional (3D) models of a plurality of assembly parts of a physical object; displaying, on a display device and over a live video of the plurality of assembly parts, an augmented reality (AR) overlay including the plurality 3D models; providing the plurality 3D models to a remote device for display on the remote device; receiving, from the remote device, data indicative of instructions for assembling the plurality of assembly parts into the physical object; and modifying, based on the received data, the AR overlay displayed on the display device to provide the instructions for assembling the plurality of assembly parts into the physical object.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, where receiving the plurality of 3D models includes: scanning, using an image sensor, the plurality of assembly parts to generate a plurality of scans of the plurality of assembly parts; and generating the plurality of 3D models based on the plurality of scans.

In some implementations, where the image sensor includes a 3D image sensor.

In some implementations, where receiving the plurality of 3D models includes: determining a type of the physical object; and identifying, based on the type of the physical, the plurality of 3D models stored in a memory.

In some implementations, where modifying, based on the received data, the AR overlay displayed on the display device includes: moving a first 3D model from a first position to a second position near a second 3D model.

In some implementations, where the one or more visual indicators include at least one of: a text, a graphical indicator, an image, or a user-generated drawing.

In some implementations, the method further includes: determining that the first 3D model is within a threshold distance from the second 3D model; and responsively coupling the first 3D model to the second 3D model at predetermined coupling points.

Another aspect of the subject matter described in this specification may be embodied in methods that include: receiving a three-dimensional (3D) model of a physical object; displaying, on a display device and over a live video of the physical object, an augmented reality (AR) overlay comprising the 3D model; providing the 3D model to a remote device for display on the remote device; receiving, from the remote device, data indicative of one or more visual indicators that provide instructions from the remote device; and modifying, based on the received data, the AR overlay displayed on the display device to display the one or more visual indicators.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, where the one or more visual indicators include at least one of: a text, a graphical indicator, an image, or a user-generated drawing.

In some implementations, where receiving the 3D model includes: scanning the physical object using an image sensor; and generating the 3D model based on the scan.

In some implementations, where the image sensor includes a 3D image sensor.

In some implementations, where receiving the 3D model includes: determining a type of the physical object; and identifying, based on the type of the physical, the 3D model stored in a memory of a computing device.

The details of one or more embodiments of these systems and methods are set forth in the accompanying drawings and description below. Other features, objects, and advantages of these systems and methods will be apparent from the description, drawings, and claims.

DETAILED DESCRIPTION

This disclosure describes methods and systems for improving augmented reality (AR) remote assistance systems. The disclosure is presented to enable any person skilled in the art to make and use the disclosed subject matter in the context of one or more particular implementations. Various modifications to the disclosed implementations will be readily apparent to those skilled in the art, and the general principles defined in this application may be applied to other implementations and applications without departing from scope of the disclosure. Thus, the present disclosure is not intended to be limited to the described or illustrated implementations, but is to be accorded the widest scope consistent with the principles and features disclosed in this application.

Existing AR systems enable a local user to conduct a video call with a remote expert. During the video call, the local user uses a camera to capture a physical object for which the local user is requesting assistance. The remote expert can provide instructions to the local user using AR features. For example, the remote expert can use an AR system to generate an AR overlay that includes instructions to the local user. However, one of the deficiencies of existing systems is that the view of the remote expert is limited to the angle that is being captured by the camera. Thus, if the remote expert needs to look at the object from multiple angles, the local user must either rotate the object manually in real-time or move around the object (if it is immovable). This approach is less user-friendly for the remote expert to provide his assistance, especially when it is useful for the expert to repeatedly change vantage points to better understand the situation or to provide complicated sequences of instructions.

This disclosure describes methods and systems for remote assistance video communication that enables a remote user (e.g., an expert) on one end of the communication to manipulate a three-dimensional (3D) model of an object that is physically present on the other end of the communication. In an embodiment, an augmented reality (AR) system acquires a scan of the object, either autonomously or via user input (e.g., a local user uses an image sensor to scan the object). The AR system generates a 3D model of the object based on the scan. The 3D model is then provided to a remote computer device associated with the remote user. The remote computer device displays the 3D model (e.g., as an AR overlay) and the remote user can interact with the displayed 3D model (e.g., move the 3D model or annotate it).

Figure 1:
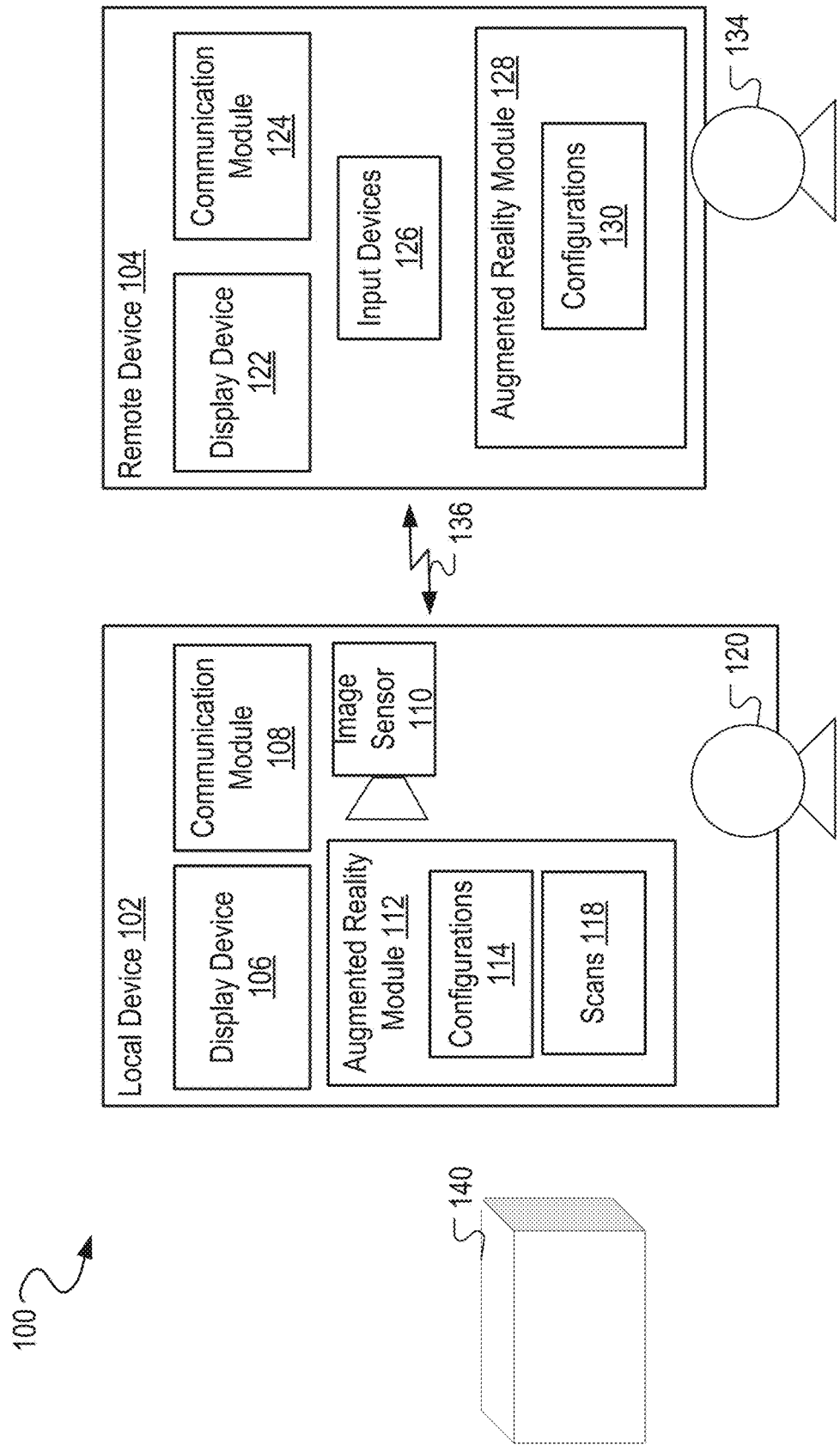
FIG. 1 illustrates an augmented reality system, according to some embodiments of the present disclosure.

FIG. 1 illustrates an augmented reality (AR) system 100, according to some implementations. The AR system 100 includes a local device 102 and a remote device 104. The local device 102 and the remote device 104 can take various forms including a head-mountable device (HMD), a mobile computing device, a tablet computing device, a desktop computing device, or any combination thereof. Other forms are possible and contemplated herein. Note that the AR system 100 is shown for illustration purposes only, as the AR system 100 can include additional components or have one or more components removed without departing from the scope of the disclosure. Further, note that the various components of the AR system 100 can be arranged or connected in any manner.

In some embodiments, the local device 102 is associated with or controlled by a local user 120, and the remote device 104 is associated with or controlled by a remote user 134. As described in more detail below, the local device 102 may be positioned in proximity to an object 140. The local user 120 may then use the local device 102 to request assistance from the remote user 134 in connection with the object 140. Although FIG. 1 shows the object 140 as a single object, the object 140 may include one or more objects.

In some embodiments, the local device 102 includes a display device 106, a communication module 108, and an image sensor 110. The display device 106 can include a display such as, a liquid crystal display (LCD), organic light-emitting diode (OLED) display, a head-mountable display, among other examples. The communication module 108 can include a wired communications interface, a wireless communications interface, or both. For example, the communication module 108 can include an antenna and electronics configured to interface via Bluetooth, Wi-Fi, 3GPP communication protocols (e.g., 4G, 5G, etc.), or other wireless communications protocols. The communication module 108 can be used to establish a communication link 136 with the remote device 104.

In some embodiments, the image sensor 110 can include a charge-coupled device (CCD) camera, a complementary metal-oxide-semiconductor (CMOS) camera, a machine vision camera, a CCD machine vision camera, a digital camera, an infrared camera, an x-ray camera, a thermal camera, an acoustic camera, an ultraviolet camera, an ultrasonic imaging camera, a magnetic resonance imaging (MM) camera, a gamma ray camera, computed tomography (CT) scanner, a point cloud scanner, a laser scanner, a LiDAR scanner, or a combination of these. Other image sensors are possible and are contemplated herein.

In some embodiments, the local device 102 includes an AR module 112, which can be used by the local device 102 to conduct AR video calls, e.g., with the remote device 104. As shown in FIG. 1, the AR module 112 includes configurations 114 and scans 118. The configurations 114 include preferences and settings for AR calls conducted using the AR module 112. The scans 118 include scans captured by the local device 102, preexisting scans, or both.

In some embodiments, the remote device 104 includes a display device 122, a communication module 124, one or more input devices 126, and an augmented reality module 128. The display device 122 and the communication module 124 may be similar to the display device 106 and the communication module 108, respectively. The input devices 126 can include one or more devices that are used to provide an input to the remote device 104. For example, the input devices 126 can include an image sensor (e.g., similar to the image sensor 110), a sound sensor (e.g., a microphone), a keyboard, or other input devices.

In some embodiments, the AR system 100 enables remote assistance to the local device 102. In these embodiments, the AR system 100 enables the remote user 134 to provide instructions to the local user 120, perhaps in connection with the object 140. To do so, the AR system 100 establishes an AR video communication between the local device 102 and the remote device 104. The remote user 134 can the use the remote device 104 to provide information to the local user 120 via the local device 102.

In some embodiments, the local device 102 and the remote device 104 are configured to conduct the AR video communication, perhaps via the communication link 136. The AR video communication can be initiated by either the local device 102 or the remote device 104, perhaps autonomously by a device or based on user input. For example, the local user 120 may provide an input to the local device 102 requesting remote assistance from the remote user 134. More specifically, the AR module 112 or the AR module 128 can determine to initiate the AR video communication. Then, the AR module 112 and the AR module 128 are configured to establish the communication link 136.

In some embodiments, the AR module 112 is configured to receive one or more scans of the object 140. In one example, the AR module 112 captures the one or more scans autonomously or in response to a user input. For instance, the AR module 112 can provide instructions to the local device 102 to scan the object 140. The local user 120 can provide instructions via a graphical user interface (GUI) displayed on the display device 106. The GUI can, for example, include a graphical element (e.g., a button labeled "Scan") that the local user 120 can select to instruct the AR module 112 to capture one or more scans of the object 140. Additionally or alternatively, the local user 120 can provide instructions to the AR module 112 via an audio interface or a visual interface (e.g., a hand motion captured by the image sensor 110) to scan the object 140.

In some embodiments, the AR module 112 uses the image sensor 110 to capture the one or more scans of the object 140. In examples where the image sensor 110 is a 3D image sensor (e.g., LiDAR), the image sensor 110 can autonomously capture the one or more scans of the object 140. In particular, the 3D scans can be used to construct a mesh image of the object 140. Alternatively, in examples where the image sensor 110 is a 2D camera, the image sensor 110 can be used to capture a plurality of images from different angles or orientations. In some examples, the GUI can provide instructions to the local user 120 to use the image sensor 110 to capture the plurality of images. In these examples, the GUI may include a status bar that provides the local user 120 with an indication of the estimated percentage of the object 140 that has been captured. This is shown in FIGS. 2A-2E (described in more detail below). In examples where the image sensor 110 includes more than one type of sensor (e.g., LiDAR and a camera), the one or more scans can be captured using the more than one type of sensor. In some examples, the AR module 112 can store the one or more scans as scans 118.

In some embodiments, the AR module 112 uses the one or more scans to generate a 3D model of the object 140. The AR module 112 can use scans from more than one type of image sensor in order to generate the 3D model. For example, LiDAR data can be used to enhance images captured by a camera.

In some embodiments, instead of scanning the object 140, the AR module 112 can select a preexisting model for the object 140. In these embodiments, the local user 120 may select the preexisting model from the library. Alternatively, the AR module 112 can use the image sensor 110 to capture one or more images of the object 140. Then, the AR module 112 can use the one or more images to identify a preexisting model from the library (e.g., using an image recognition algorithm). In such examples, the AR module 112 can confirm the selected preexisting model with the local user 120. Note that the preexisting models may be stored as scans 118.

In some embodiments, generating or obtaining the 3D model of the object 140 can be performed either before the AR video communication or during the communication (e.g., if the remote user 134 is going to provide the local user 120 with scanning instructions).

In some embodiments, the local user 120 can initiate an AR-enabled live video call by either calling the remote user 134 or accepting a call from the remote user 134. In particular, the display device 106 can display a GUI that includes graphical elements that enable the local user 120 to either initiate a video call or join an existing call. In the scenario where the local user 120 initiates a video call, the local user 120 can press a create button. This button provides the local user 120 with an interface through which the user can share the 3D model of the object 140. The user can then share the 3D model during the video call to enable augmented reality data visualization. If the remote user 134 wants to join the video call to provide remote assistance, the remote user remote user 134 can click a join button of a GUI displayed on the display device 122.

In some embodiments, the AR module 112 and the AR module 12 can include video specifications for the AR-enabled live video call. The video specifications include one or more of: a type of the connection initiated for audio and video type, a live stream dimension, desired frame rate, bitrate and orientation, mobile device access permission to audio and camera usage, a separate request to join or creating a live video call connection.

In the AR-enabled live video call, a live interactive remote assistance with the 3D model can be performed. In some embodiments, the AR-enabled live video call can operate in one of several modes. In a first mode called an AR mode, the 3D model of the object 140 is superimposed on top of the scene in front of the local user 120. In a second mode called an isolated mode, the 3D model of the object 140 is displayed in an isolated view with an empty background.

In some embodiments, the remote user 134 can aid the local user 120 in the video call using augmented reality features. More specifically, the remote user 134 can view the 3D model of the object 140 and apply modifications to it.

The local user 120 can view the modifications in real-time on the video stream. Additionally, the remote user 134 can provide instructions to the local user 120 by drawing on the screen during the video stream view and provide written instructions. More specifically, the remote user 134 can: (i) rotate the model in 3D, (ii) annotate the model in 3D with notes and free-shape drawings, (iii) provide step-by-step instructions to perform a certain procedure. After joining, the remote user 134 has the ability to provide remote assistance by editing the received 3D models. The edits can be viewed in real-time by the assisted user.

In some embodiments, the configurations 130 include configurations for the AR module 128. The configurations 130 may be determined based on user input, set according to default rules, among other examples. The configurations 130 include a function that allows the remote user 134 to interact with the 3D model. This function is initiated when the AR call starts. The configurations 130 also include types of gestures that are used to provide input to the AR module 128. Further, the configurations 130 include a function for translating the inputs by the remote user 134 into visual information (e.g., text, drawings, etc.) that is provided in the AR video feed. This function translates positions of the inputs into the visual information displayed in the viewer coordinate system. For example, if the input is a touch input to the display device 122, the translator performs pixel translations by translating the positions of the pixels touched by the user input into the positions of the visual information.

In some embodiments, the AR system 100 is used to provide remote assistance for a complex assembly job. In these embodiments, the local user 120 inputs representations of the individual parts that are to be used in the assembly. Inputting the representations of the individual parts may involve scanning one or more of the individual parts and/or selecting one or more preexisting scans from a library of 3D models. During the call, 3D models of the individual parts are provided to the remote device 104. Specifically, the 3D models are displayed on the display device 122 of the remote device 104.

In some embodiments, the remote user 134 can provide inputs indicating how to assemble the 3D models. In one example, the remote user 134 can perform virtual assembly can be done manually by dragging and rotating the components using appropriate gestures on the touch screen for each action. In some examples, the additional feature is also the usage of smart snapping so that simply selecting the virtual parts would assemble them, or at least bringing them close enough together would snap them together. The local user 120 can follow the instructions and perform the assembly, perhaps during the call.

Figure 2B:
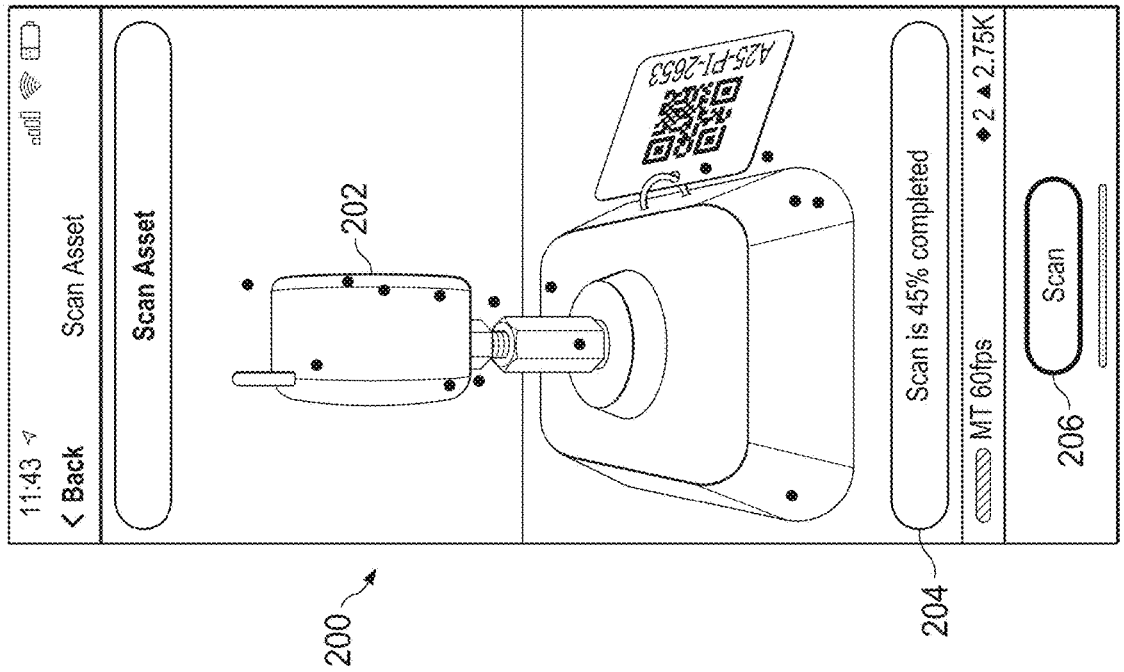
FIGS. 2A, 2B, 2C, 2D, 2E, and 2F each illustrate a graphical user interface for scanning an object, according to some embodiments of the present disclosure.
Figure 2A:
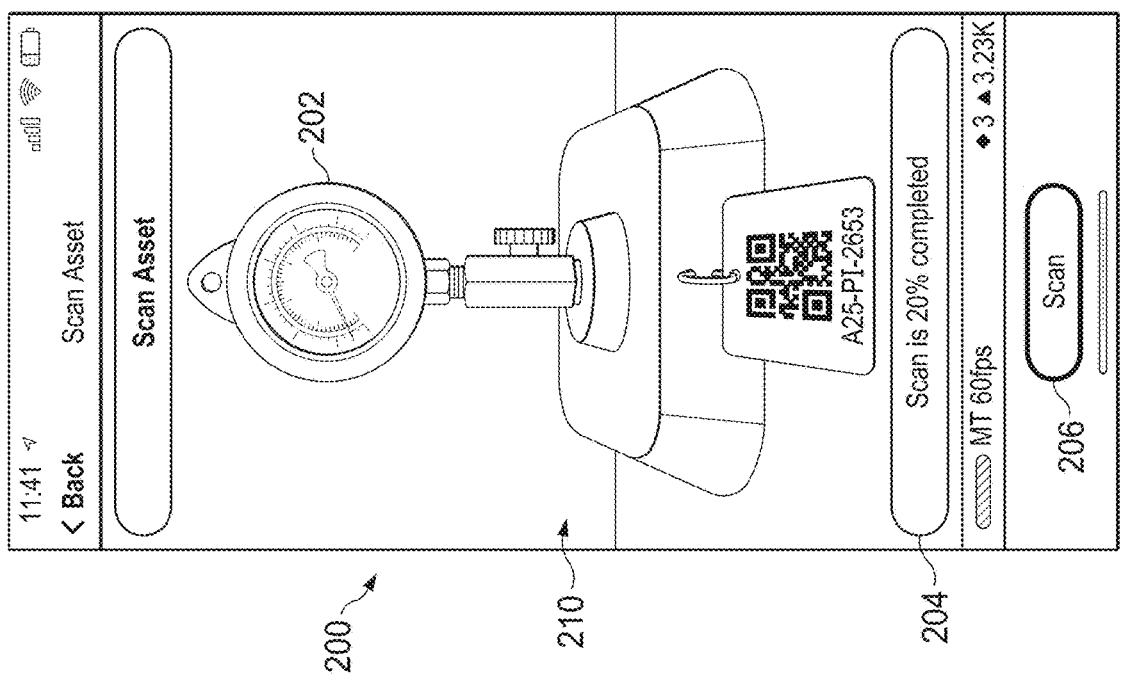
Figure 2D:
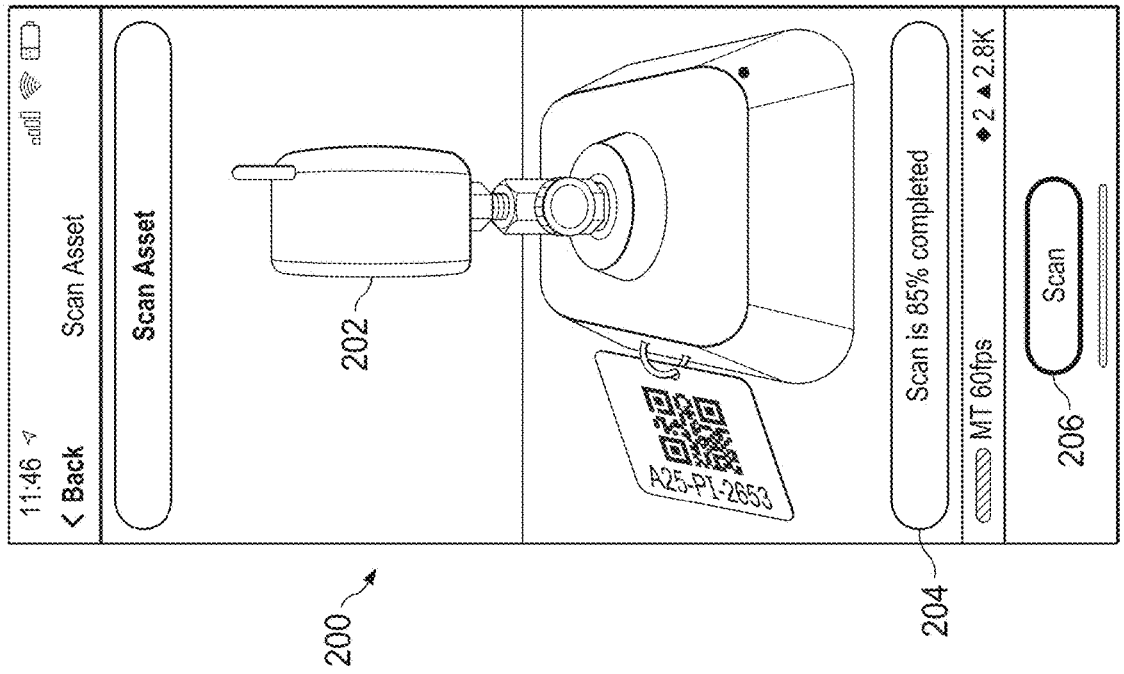
Figure 2C:
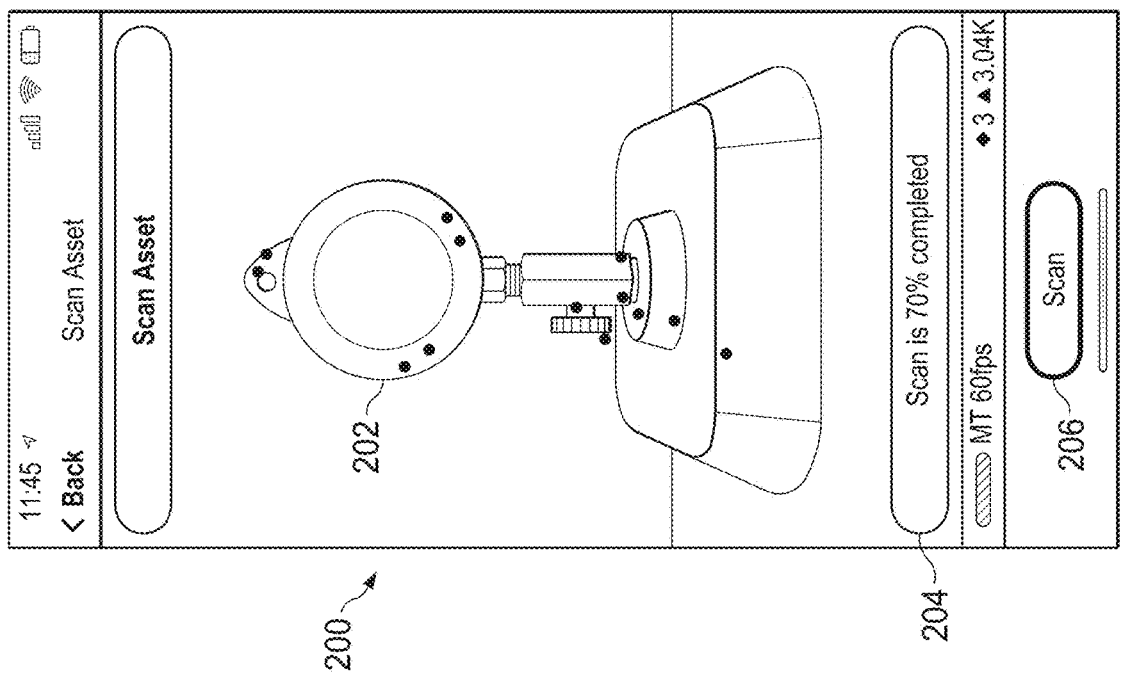
Figure 2F:
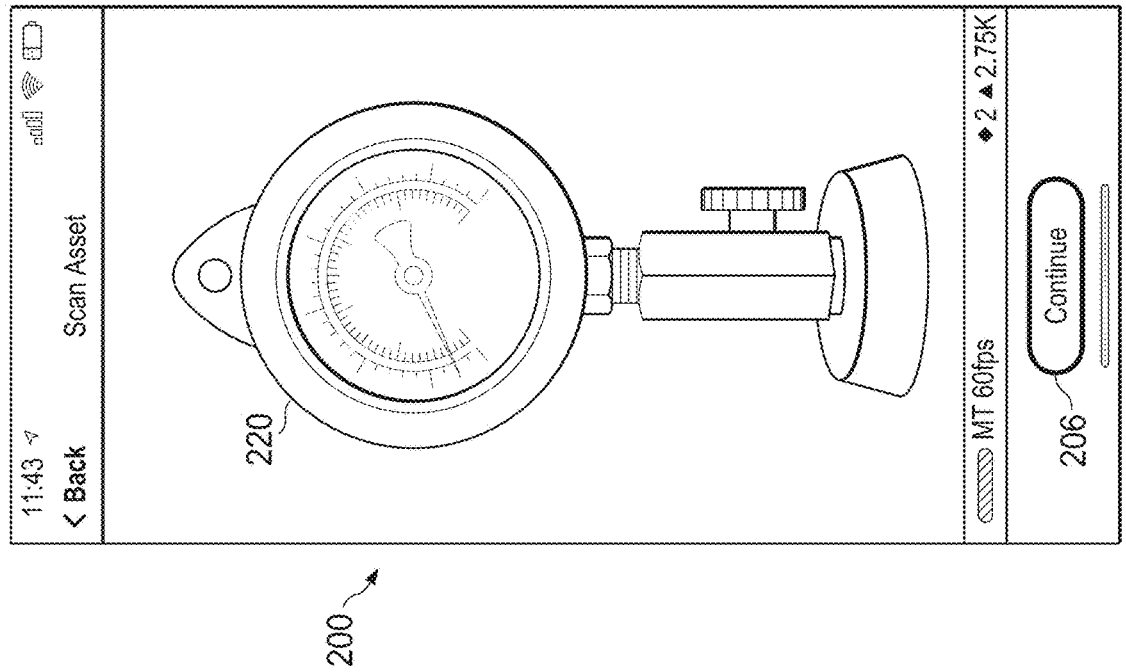
Figure 2E:
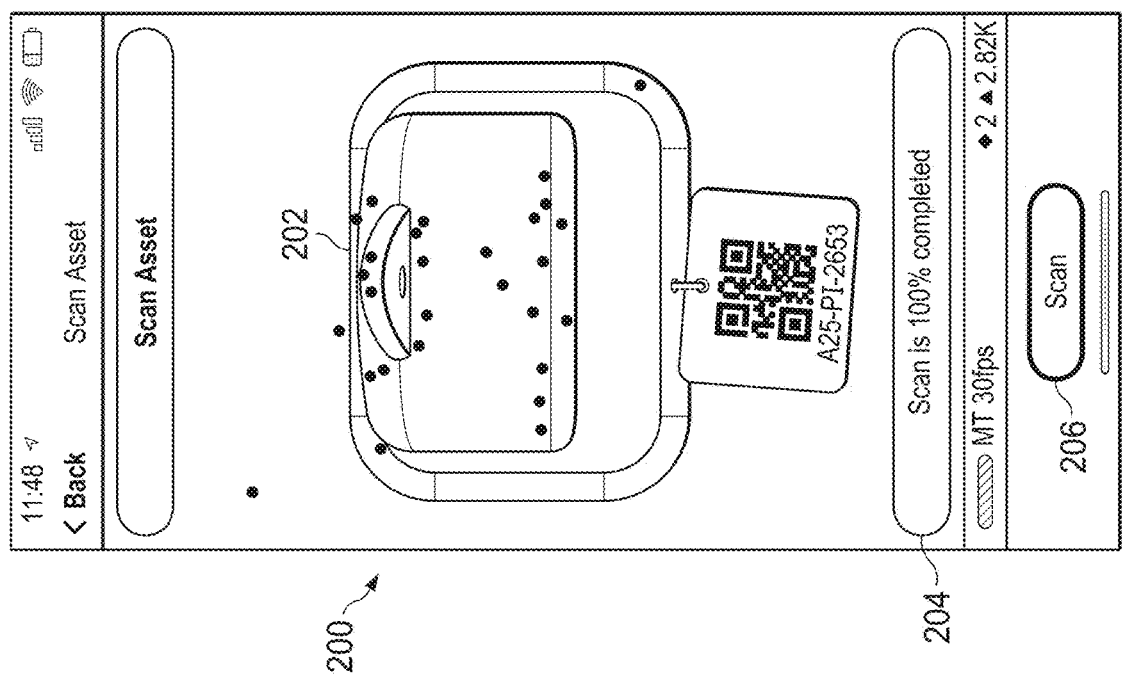

FIGS. 2A, 2B, 2C, 2D, and 2E each illustrate a graphical user interface (GUI) 200 for scanning an object, according to some embodiments of the present disclosure. As shown in FIG. 2A, the GUI 200 can include a camera window 210 that displays a view captured by a camera, a scan button 206, and a status bar 204. In some examples, the GUI 200 provides scanning instructions to a user for scanning an object captured by the camera. In this example, the object is object 202. In some examples, the GUI 200 provides instructions to scan the object 202 from multiple angles or orientations. As shown in FIGS. 2A-2E, the GUI 200 instructs the user to scan the object from multiple angles. As the user scans the object 202, the status bar 204 indicates the percentage of the object 202 that has been scanned. Once the scans of the object 202 are complete, the GUI 200 can display a 3D model 220 of the object 202, as shown in FIG. 2F.

Figure 3:
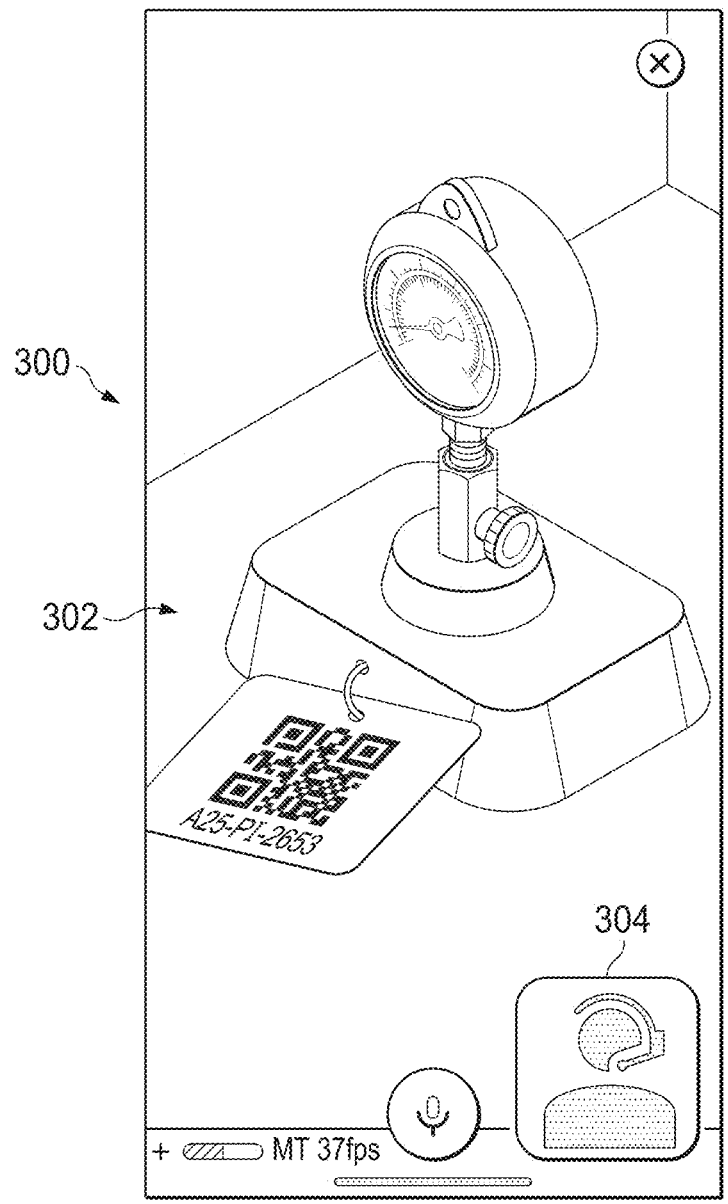
FIG. 3 illustrates a graphical user interface of an augmented reality system, according to some embodiments of the present disclosure.

FIG. 3 illustrates a graphical user interface 300 of an augmented reality system, according to some embodiments of the present disclosure. As shown in FIG. 3, the GUI 300 includes a camera window 302 that displays a view captured by a camera. Additionally, the GUI 300 can include a window 304 that displays an image or video feed form the remote user.

Figure 4B:
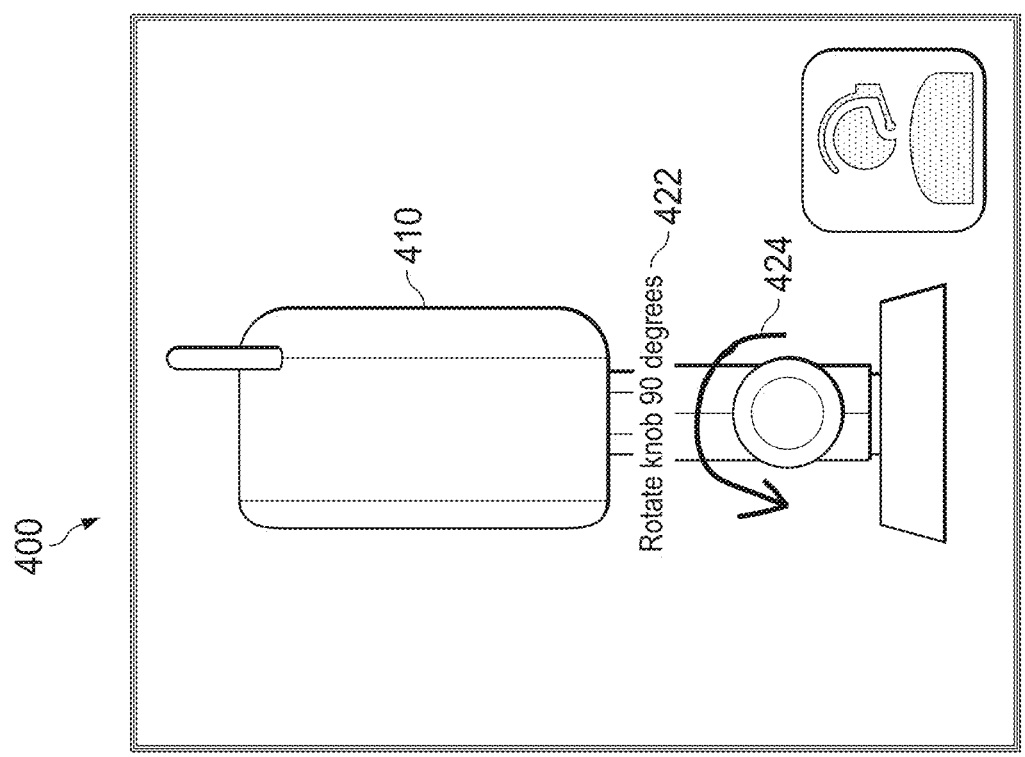
FIG. 4A and FIG. 4B illustrate an example of augmented reality indicators displayed on a graphical user interface, according to some embodiments of the present disclosure.
Figure 4A:
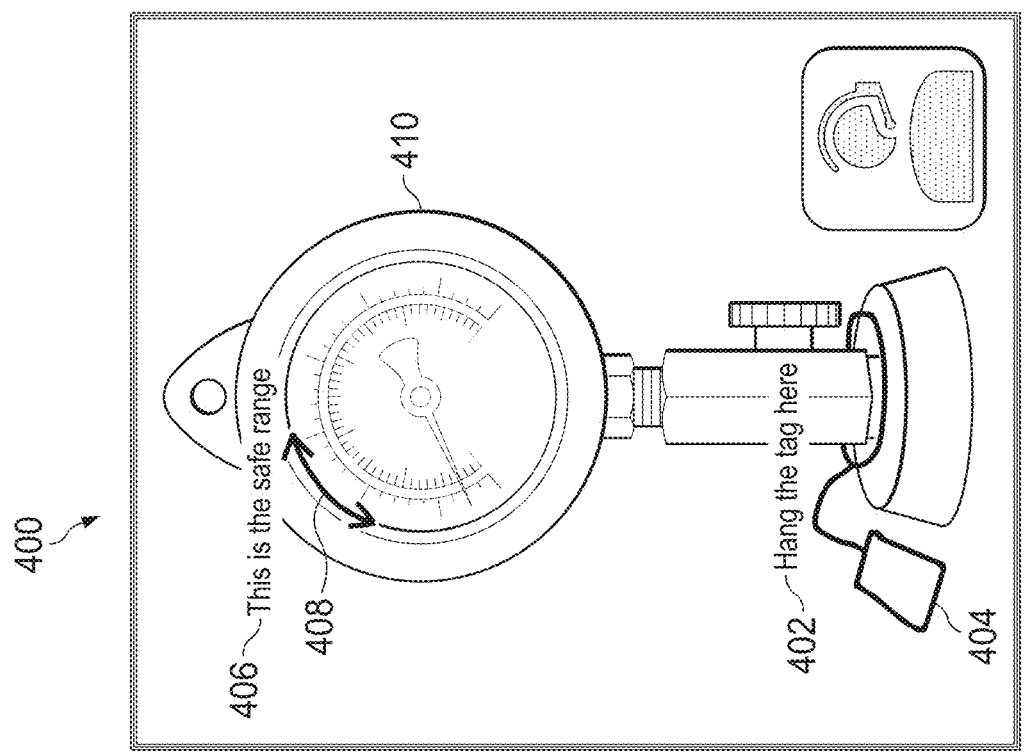

FIG. 4A and FIG. 4B illustrate an example of augmented reality indicators displayed on a graphical user interface 400, according to some embodiments of the present disclosure. As shown in FIG. 4A, the GUI 400 displays a 3D model of an object 410. A remote user may provide data in connection with the 3D model 410. In response, the GUI 400 displays one or more visual indicators based on the data received from the remote user. As shown in FIG. 4A, the visual indicators include drawings 404, 408 and text 402, 406. As shown in FIG. 4B, the remote user may rotate the object 410. Accordingly, a different view of the object 410 is shown. The remote user may also provide additional data in connection with the object 410. In response, the GUI 400 displays one or more visual indicators based on the data received from the remote user. As shown in FIG. 4B, the visual indicators include text 422 and drawing 424.

Figure 5B:
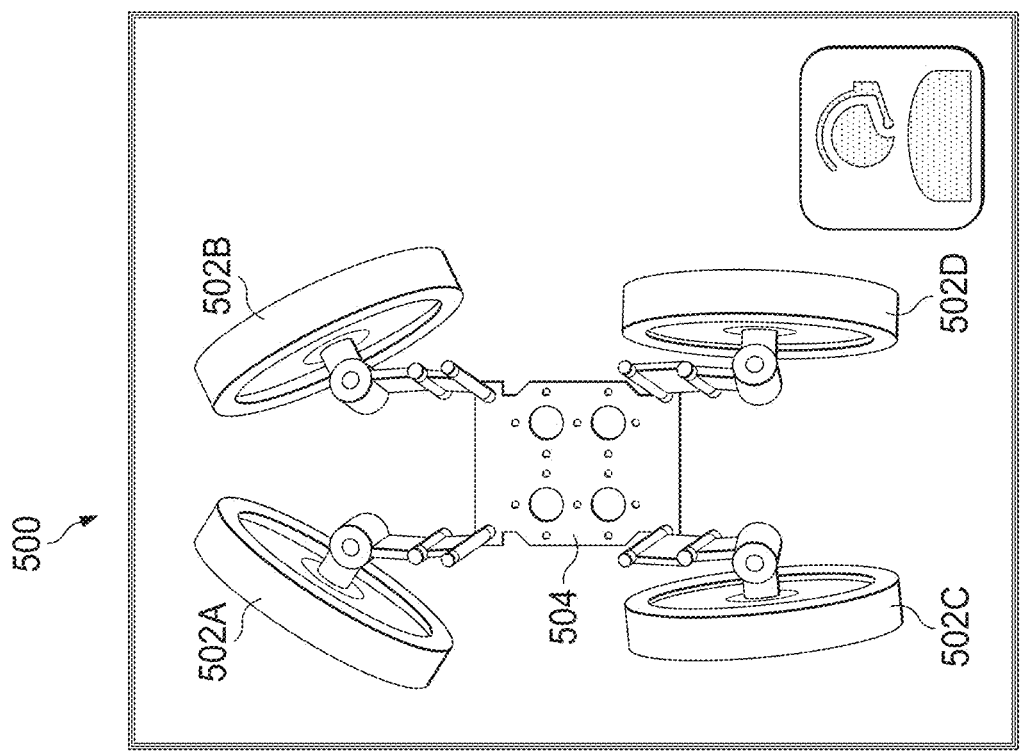
FIGS. 5A, 5B illustrates an example of augmented reality assembly instructions displayed on a graphical user interface, according to some embodiments of the present disclosure.
Figure 5A:
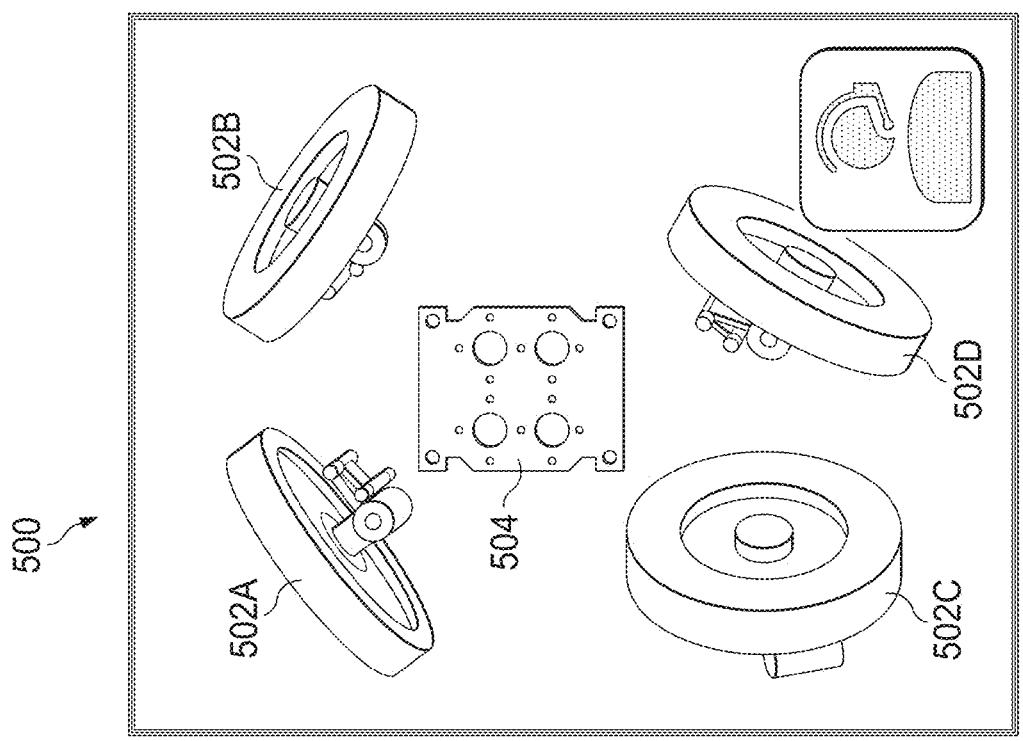

FIGS. 5A, 5B illustrates an example of augmented reality assembly instructions displayed on a graphical user interface, according to some embodiments of the present disclosure. FIG. 5A illustrates a GUI 500 displayed by a user device associated with a local user requesting assistance. The GUI 500 displays 3D models of a plurality of disassembled components 502A, 502B, 502C, 502D, and 504. A remote user can provide assembly instructions, e.g., by providing an input to a remote device. As shown in FIG. 5B, the GUI 500 displays, in real-time, the assembly instructions provided by the remote user. For example, the remote user can manually move the plurality of disassembled components to show how they are assembled. The GUI 500 displays that movement in real-time such that the local user can follow the assembly instructions.

Figure 6A:
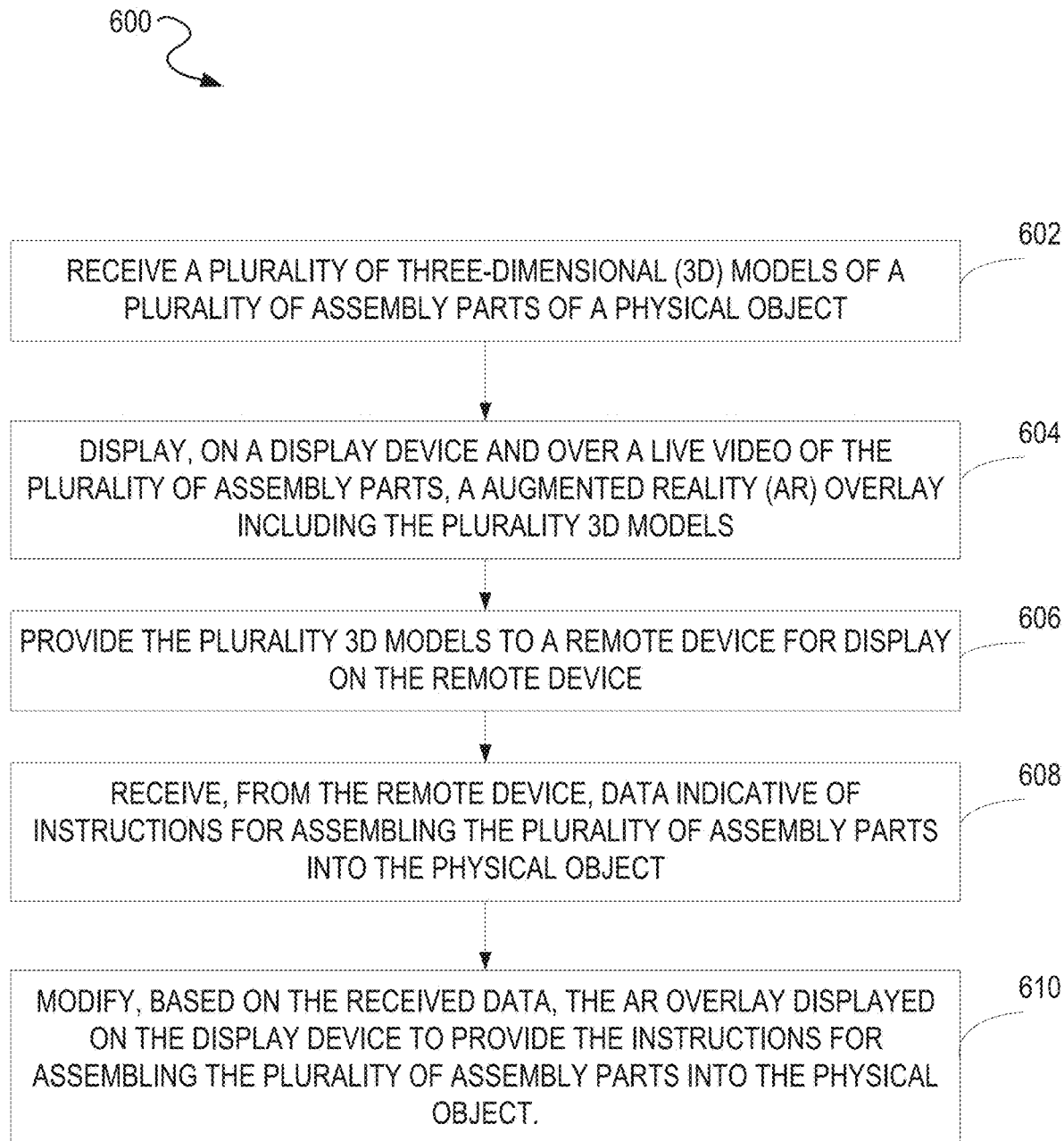
FIG. 6A is a flowchart of an example method, according to some embodiments of the present disclosure.

FIG. 6A illustrates a flowchart of an example method 600, in accordance with some embodiments. For clarity of presentation, the description that follows generally describes method 600 in the context of the other figures in this description. For example, method 600 can be performed by the local device 102 of FIG. 1. It will be understood that method 600 can be performed, for example, by any suitable system, environment, software, hardware, or a combination of systems, environments, software, and hardware, as appropriate. In some implementations, various steps of method 600 can be run in parallel, in combination, in loops, or in any order.

At step 602, method 600 involves receiving a plurality of three-dimensional (3D) models of a plurality of assembly parts of a physical object.

At step 604, method 600 involves displaying, on a display device and over a live video of the plurality of assembly parts, an augmented reality (AR) overlay including the plurality 3D models.

At step 606, method 600 involves providing the plurality 3D models to a remote device for display on the remote device.

At step 608, method 600 involves receiving, from the remote device, data indicative of instructions for assembling the plurality of assembly parts into the physical object.

At step 610, method 600 involves modifying, based on the received data, the AR overlay displayed on the display device to provide the instructions for assembling the plurality of assembly parts into the physical object.

In some implementations, where receiving the plurality of 3D models includes: scanning, using an image sensor, the plurality of assembly parts to generate a plurality of scans of the plurality of assembly parts; and generating the plurality of 3D models based on the plurality of scans.

In some implementations, where the image sensor includes a 3D image sensor.

In some implementations, where receiving the plurality of 3D models includes: determining a type of the physical object; and identifying, based on the type of the physical, the plurality of 3D models stored in a memory.

In some implementations, where modifying, based on the received data, the AR overlay displayed on the display device includes: moving a first 3D model from a first position to a second position near a second 3D model.

In some implementations, where the one or more visual indicators include at least one of: a text, a graphical indicator, an image, or a user-generated drawing.

In some implementations, method 600 further including: determining that the first 3D model is within a threshold distance from the second 3D model; and responsively coupling the first 3D model to the second 3D model at predetermined coupling points.

Figure 6B:
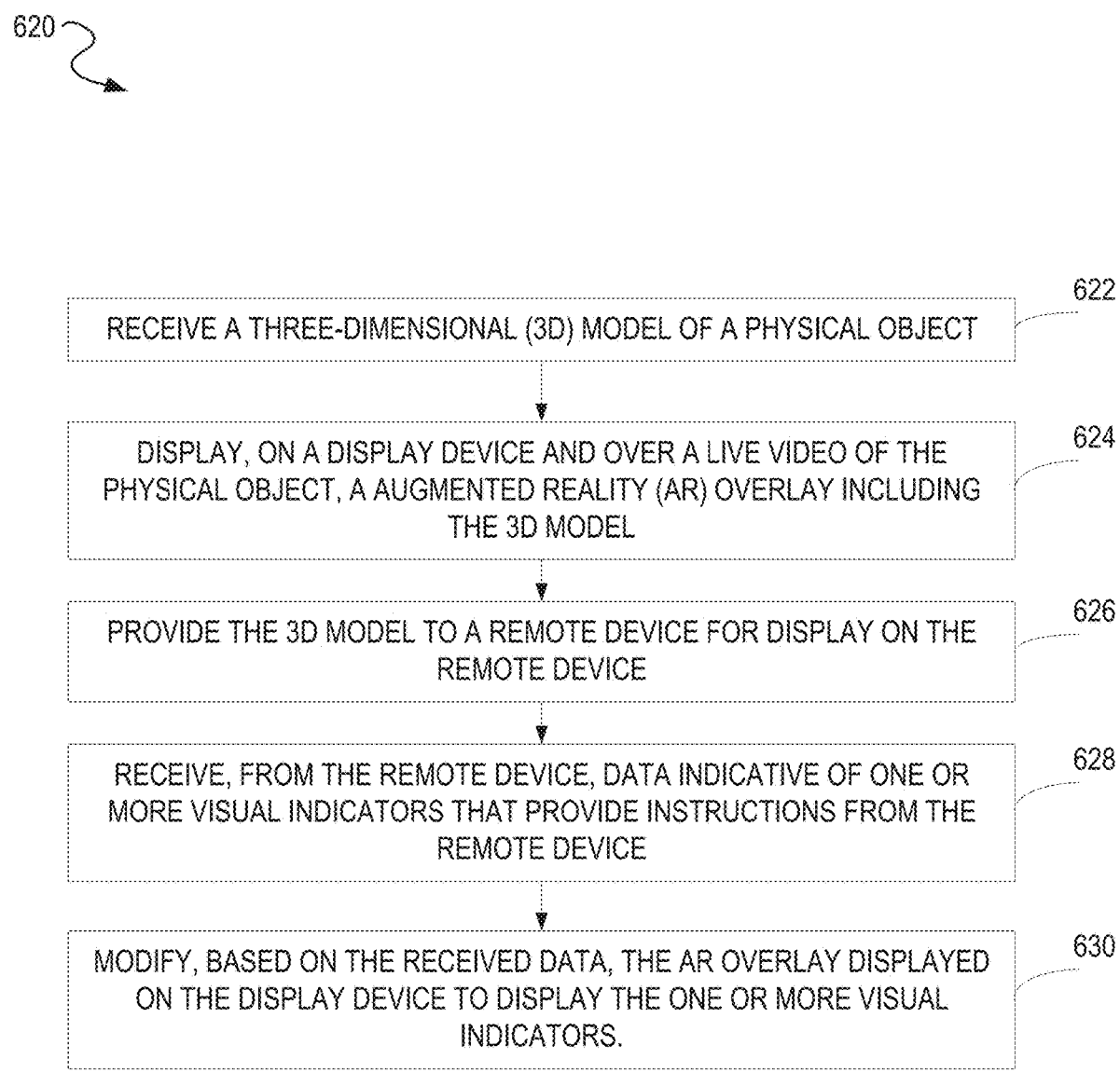
FIG. 6B is a flowchart of another example method, according to some embodiments of the present disclosure.

FIG. 6B illustrates a flowchart of an example method 620, in accordance with some embodiments. For clarity of presentation, the description that follows generally describes method 600 in the context of the other figures in this description. For example, method 620 can be performed by the local device 102 of FIG. 1. It will be understood that method 620 can be performed, for example, by any suitable system, environment, software, hardware, or a combination of systems, environments, software, and hardware, as appropriate. In some implementations, various steps of method 600 can be run in parallel, in combination, in loops, or in any order.

At step 622, method 620 involves receiving a three-dimensional (3D) model of a physical object.

At step 624, method 620 involves displaying, on a display device and over a live video of the physical object, an augmented reality (AR) overlay comprising the 3D model.

At step 626, method 620 involves providing the 3D model to a remote device for display on the remote device.

At step 628, method 620 involves receiving, from the remote device, data indicative of one or more visual indicators that provide instructions from the remote device.

At step 630, method 620 involves modifying, based on the received data, the AR overlay displayed on the display device to display the one or more visual indicators.

In some implementations, where the one or more visual indicators include at least one of: a text, a graphical indicator, an image, or a user-generated drawing.

In some implementations, where receiving the 3D model includes: scanning the physical object using an image sensor; and generating the 3D model based on the scan.

In some implementations, where the image sensor includes a 3D image sensor.

In some implementations, where receiving the 3D model includes: determining a type of the physical object; and identifying, based on the type of the physical, the 3D model stored in a memory of a computing device.

Figure 7:
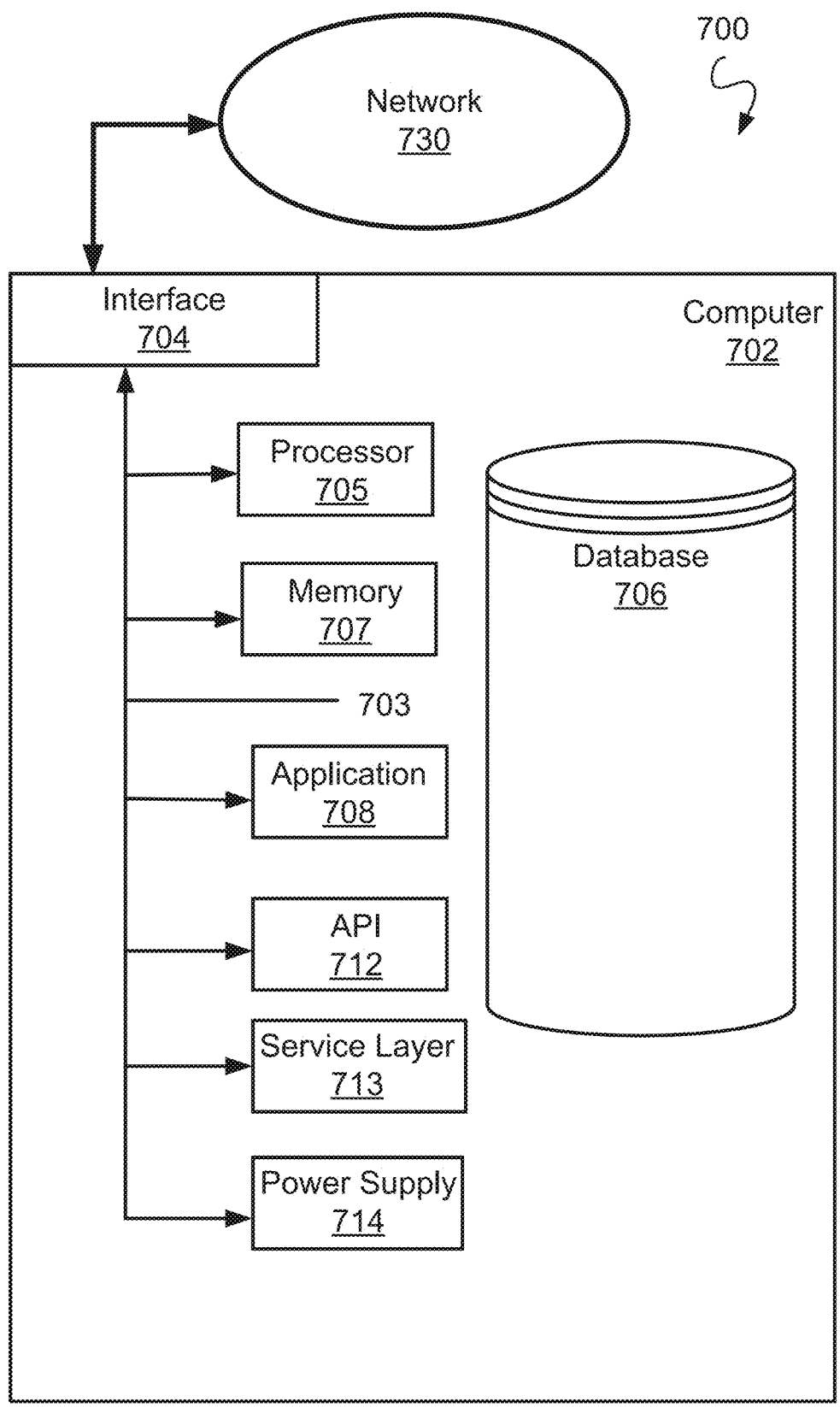
FIG. 7 is a block diagram of an example computer system, according to some embodiments of the present disclosure.

FIG. 7 is a block diagram of an example computer system 700 that can be used to provide computational functionalities associated with described algorithms, methods, functions, processes, flows, and procedures, according to some implementations of the present disclosure. In some implementations, the local device 102 and remote device 104 can be the computer system 700, include the computer system 700, or can communicate with the computer system 700.

The illustrated computer 702 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 702 can include a Smart Embedded Management Agent (SEMA), such as a built-in ADLINK SEMA 2.2, and a video sync technology, such as Quick Sync Video technology supported by ADLINK MSDK+. In some examples, the computer 702 can include the MXE-5400 Series processor-based fanless embedded computer by ADLINK, though the computer 702 can take other forms or include other components.

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a high level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs 712.

The service layer 713 can provide software services to the computer 702 and other components (whether illustrated or not) that are communicably coupled to the computer 702. The functionality of the computer 702 can be accessible for all service consumers using this service layer 713. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 can include an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and manipulate data to perform the operations of the computer 702, including operations using algorithms, methods, functions, processes, flows, and procedures as described in the present disclosure.

The computer 702 can also include a database 706 that can hold data for the computer 702 and other components connected to the network 730 (whether illustrated or not). For example, database 706 can be an in-memory, conventional, or a database storing data consistent with the present disclosure. In some implementations, the database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

An application 708 can be an algorithmic software engine providing functionality according to particular needs, desires, or particular implementations of the computer 702 and the described functionality. For example, an application 708 can serve as one or more components, modules, or applications 708. Multiple applications 708 can be implemented on the computer 702. Each application 708 can be internal or external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system including computer 702, with each computer 702 communicating over network 730. Further, the terms "client", "user", and other appropriate terminology can be used interchangeably without departing from the scope of the present disclosure. Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware; in computer hardware, including the structures disclosed in this specification and their structural equivalents; or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus", "computer", and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus and special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document; in a single file dedicated to the program in question; or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes; the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks, optical memory devices, and technologies including, for example, digital video disc (DVD), CD ROM, DVD+/−R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), or a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations; and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method to be performed by a local device, the method comprising:
   receiving a plurality of three-dimensional (3D) models each corresponding to one of a
   plurality of assembly parts of a physical object, the plurality of assembly parts present within a field of view of the local device;
   displaying, on a display device of the local device, an augmented reality (AR) overlay over a live video, the AR overlay comprising the plurality 3D models;
   providing the plurality 3D models to a remote device for display on the remote device;
   receiving, from the remote device, instructions for assembling the plurality of assembly parts into the physical object, the instructions comprising a visual indicator describing a step for assembling the physical object; and
   modifying, based on the received instructions, the AR overlay displayed on the display device to display the visual indicator for assembling the plurality of assembly parts into the physical object, wherein the visual indicator comprises at least one of: a text, a graphical indicator, or a user-generated drawing.

2. The method of claim 1, wherein receiving the plurality of 3D models comprises:
   scanning, using an image sensor of the local device, the plurality of assembly parts to generate a plurality of scans of the plurality of assembly parts; and
   generating the plurality of 3D models based on the plurality of scans.

3. The method of claim 2, wherein the image sensor comprises a 3D image sensor.

4. The method of claim 1, wherein receiving the plurality of 3D models comprises:
   determining a type of the physical object; and
   identifying, based on the type of the physical, the plurality of 3D models stored in a memory.

5. The method of claim 1, wherein modifying, based on the received instructions, the AR overlay displayed on the display device comprises:

moving a first 3D model from a first position to a second position near a second 3D model.

6. The method of claim 5, further comprising:

determining that the first 3D model is within a threshold distance from the second 3D model; and responsively coupling the first 3D model to the second 3D model at predetermined coupling points.

7. A local device comprising:

one or more processors configured to perform operations comprising:

receiving a plurality of three-dimensional (3D) models each corresponding to one of a plurality of assembly parts of a physical object, the plurality of assembly parts present within a field of view of the local device;

displaying, on a display device of the local device, an augmented reality (AR) overlay over a live video of the plurality of assembly parts, the AR overlay comprising the plurality 3D models;

providing the plurality 3D models to a remote device for display on the remote device;

receiving, from the remote device, instructions for assembling the plurality of assembly parts into the physical object, the instructions comprising a visual indicator describing a step for assembling the physical object; and modifying, based on the received instructions, the AR overlay displayed on the display device to display the visual indicator for assembling the plurality of assembly parts into the physical object, wherein the visual indicator comprises at least one of: a text, a graphical indicator, or a user-generated drawing.

8. The local device of claim 7, wherein receiving the plurality of 3D models comprises:

scanning, using an image sensor of the local device, the plurality of assembly parts to generate a plurality of scans of the plurality of assembly parts; and generating the plurality of 3D models based on the plurality of scans.

9. The local device of claim 8, wherein the image sensor comprises a 3D image sensor.

10. The local device of claim 7, wherein receiving the plurality of 3D models comprises:

determining a type of the physical object; and identifying, based on the type of the physical, the plurality of 3D models stored in a memory.

11. The local device of claim 7, wherein modifying, based on the received instructions, the AR overlay displayed on the display device comprises:

moving a first 3D model from a first position to a second position near a second 3D model.

12. The local device of claim 11, the operations further comprising:

determining that the first 3D model is within a threshold distance from the second 3D model; and responsively coupling the first 3D model to the second 3D model at predetermined coupling points.

\* \* \* \* \*

UNITED STATES PATENT AND TRADEMARK OFFICE
CERTIFICATE OF CORRECTION

Page 1 of 1

PATENT NO. : 12,283,003 B2
APPLICATION NO. : 17/714704
DATED : April 22, 2025
INVENTOR(S) : Abdulrahman Althobaiti, Fadl Abdellatif and Sahejad Patel It is certified that error appears in the above-identified patent and that said Letters Patent is hereby corrected as shown below:

In the Claims

In Column 16, Line 36, Claim 1, please replace "video," with -- video of the plurality of assembly parts, --.

Signed and Sealed this
Tenth Day of June, 2025

Coke Morgan Stewart
*Acting Director of the United States Patent and Trademark Office*